(12) United States Patent
Yamada et al.

(10) Patent No.: US 6,602,532 B2
(45) Date of Patent: Aug. 5, 2003

(54) PROCESS OF PRESERVING FOOD AND FOOD PRESERVATIVE

(75) Inventors: Kazuko Yamada, Ashiya (JP); Keiko Saito, Osaka (JP)

(73) Assignee: F.G.A. Laboratories Flavourence Corporation, Osaka (JP)

( * ) Notice: Subject to any disclaimer, the term of this patent is extended or adjusted under 35 U.S.C. 154(b) by 175 days.

(21) Appl. No.: 09/798,516

(22) Filed: Mar. 2, 2001

(65) Prior Publication Data

US 2001/0033884 A1 Oct. 25, 2001

(30) Foreign Application Priority Data

Mar. 3, 2000 (JP) .......................... 2000-059272

(51) Int. Cl.[7] .......................... A23B 4/20; A23L 3/3463
(52) U.S. Cl. .......................... 426/335; 426/321; 426/656
(58) Field of Search ................................ 426/335, 656, 426/321

(56) References Cited

U.S. PATENT DOCUMENTS 2,711,976 A 6/1955 Castellani
4,461,777 A 7/1984 Murase et al.

FOREIGN PATENT DOCUMENTS

| JP | 70027114 B | * | 9/1967 |
| JP | 53 050361 A | | 5/1978 |
| JP | 62 058974 A | | 3/1987 |
| JP | 62 201563 A | | 9/1987 |
| JP | 05 00072 A | | 1/1993 |

OTHER PUBLICATIONS

Hu et al. Antibacterial Action of Glycine on *E. coli* in the Presence of Ethanol, School of Agriculture, Ibaraki University, vol. 40, No. 4, pp. 266–273.

* cited by examiner

*Primary Examiner*—Helen Pratt
(74) *Attorney, Agent, or Firm*—Cohen, Pontani, Lieberman & Pavane

(57) ABSTRACT

A process of preserving food which includes adding serine, especially L-serine, to food. According to the present invention, provided is a convenient process of preserving food for a long term by adding serine to food, in particular by performing a heat treatment after the addition of serine to food. Since serine is one kind of amino acids, it does not deteriorate quality of food itself and can preserve food safely.

17 Claims, 15 Drawing Sheets

US 6,602,532 B2

PROCESS OF PRESERVING FOOD AND FOOD PRESERVATIVE

CROSS-REFERENCE TO RELATED APPLICATION

This application is related to Japanese application No. 2000-59272 filed on Mar. 3, 2000 whose priority is claimed under 35 USC §119, the disclosure of which is incorporated by reference in its entirety.

BACKGROUND OF THE INVENTION

1. Field of the Invention

The present invention relates to a process of preserving food and a food preservative. In particular, it relates to a process of preserving food with serine, which is one of amino acids, and a food preservative.

2. Related Art

Preservation of food for a long term without denaturation and putrefaction is very important from the viewpoint of economy, food hygiene and nutrition.

There are various causes for the denaturation or putrefaction of food, but the main one is proliferation of microorganism. Accordingly, to prevent the denaturation or putrefaction of food, prevention of microorganism growth, sterilization and elimination of microorganism are effective.

Prevention of microorganism growth in food is related to water activity, pH value, preservation temperature, atmosphere such as oxygen concentration, pressure and the like. Specifically, it may be carried out by dehydration, cold storage, freezing, salting, sugaring, pickling, smoking, use of an oxygen adsorber and the like. However, some of them cannot be applied depending on the kind of food.

Sterilization of microorganism includes a heat sterilization, a high pressure sterilization, a sterilization with radiation, electron beam and ultraviolet light, a microwave heat sterilization and use of an antimicrobial agent.

In the heat sterilization, microorganisms are completely perished by long-term heating at high temperature. However, the heating may possibly deteriorate taste and quality of food of some kinds. Further, short-term heating at low temperature cannot achieve satisfactory sterilization since highly heat-resistive microorganisms and spores are left.

With use of a direct sunbeam or a UV sterilization lamp, microorganisms on a food surface are perished. However, light hardly reaches the depth of food and oxidation of fatty acid happens easily.

Further, the antimicrobial agent often causes quite harmful effects not only to microorganisms but also to human bodies.

It has been known that glycine, which is one of amino acids, shows bacteriostasis to *Escherichia coli* in the presence of ethanol (see Food Hygienic Journal, Vol.40, No.4, p266–273). However, it has not been revealed yet that other amino acids show bacteriostasis.

Under the present circumstances, a sterilization process capable of preserving food easily and safely for a long time without deteriorating food quality has merely been selected from various sterilization processes, depending on the kinds of food.

SUMMARY OF THE INVENTION

The inventors of the present invention have conducted various examinations on an effective process of preserving food while minimizing the deterioration of food quality without any harm to human body. Then, they have found that addition of serine to food at a low temperature heating of food shows bacteriostasis to Gram-negative/positive bacilli generally contained in food. Thus, the present invention has been achieved.

According to the invention, provided is a process of preserving food comprising: adding serine to food.

Still according to the invention, provided is a food preservative comprising serine.

PREFERRED EMBODIMENT OF THE INVENTION

Figure 1:
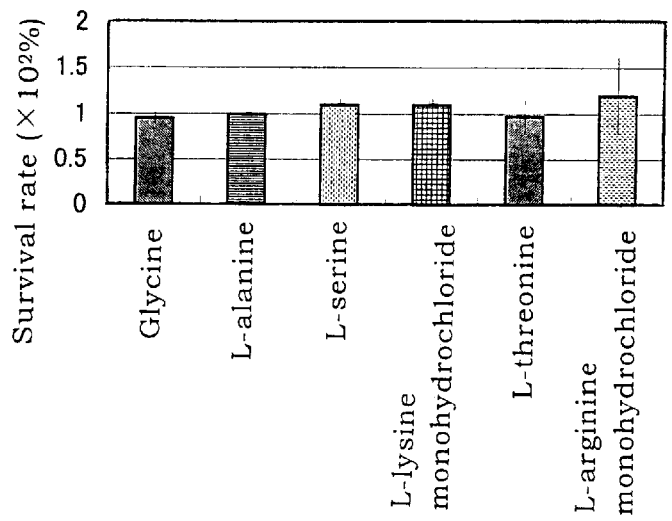
FIG. 1 is a graph illustrating the survival rate of *Bacillus subtilis* in the case where the heat sterilization was not performed after addition of amino acids.

The present invention relates to a process of preserving food by adding serine to food.

In the present invention, food to be added with serine is not particularly limited and any food is available. Example thereof includes confectionery such as cakes, castillas (sponge cakes), steamed buns, bean paste, cream puffs, rice crackers, cookies, jellies, puddings and breads; seasonings such as soy sauce, Worcestershire sauce and mayonnaise; retort pouched foods or canned foods such as curry, cream stew, meat sauce and corn soup; cooked foods such as fried foods, hamburg steak, grilled fish, grilled meat, omelets, boiled and seasoned fish, boiled and seasoned vegetables; boiled fish paste such as Kamaboko and Chikuwa; noodles such as Chinese noodles, Udon (wheat flour noodles) and Soba (buckwheat noodles), soup powder or soup paste; instant foods such as instant Miso soup and instant noodles; processed rice foods such as rice ball, rice cake and steamed rice; frozen foods such as processed vegetables, shao-mai, jiao-zi, pilaf, boiled rice with various ingredients; dairy foods such as lactic drinks, cheese and fresh cream; beverages such as fruit juice and soft drinks; perishables such as vegetables, fruits, meat and fish. Among them, foods generally subjected to a heat treatment at low temperature are preferable. Foods containing casein, in particular dairy foods at neutral pH range, may sometimes weaken effects of preservative generally used for food. However, the process of the present invention can successfully preserve such foods, i.e., bacteriostasis is effectively expressed.

Serine used in the present invention may be either of D-serine and L-serine. Racemic serine is also available. D-serine and L-serine show different bacteriostasis depending on the kinds of bacteria. In many cases L-serine is preferable. Serine is preferably subjected to a heat treatment at low temperature as mentioned later.

Amount of serine added to food is suitably determined depending on various factors such as a degree of bacteria contamination in the food, kind or quantity of ingredients of the food and how the food has been processed. For example, it may be about 0.05 to 10 wt %, preferably about 0.5 to 5 wt % with respect to weight of the food.

Where the food is in the form of liquid, semisolid or paste, serine may be added as it is and uniformly mixed with or dispersed in the food. Alternatively, it may be dissolved in water or the like in advance and then sprayed on or mixed with the food so that it is uniformly distributed in the food. Where the food is in the form of solid, serine is preferably dissolved in water or the like to spray on or mixed with the food so that it is uniformly distributed in the food.

In the present invention, it is preferred to perform a heat treatment at low temperature after serine is added to the food. The low temperature heat treatment includes so-called low temperature pasteurization under normal pressure or high pressure, or low temperature long time pasteurization. In general, it means maintenance of temperature of less than 100° C. for about several minutes to several tens of minutes under normal pressure. More specifically, the heat treatment is carried out at about 60 to 80° C. for 20 to 30 minutes or at about 81° C. or more for 10 minutes or more under normal pressure.

According to the present invention, bacteriostasis of serine is synergistically improved by optionally combining serine and one or more kinds of compounds selected from the group consisting of protamine, lysozyme, glycine, ε-polylysine, ethanol, sodium acetate and sodium thiamine dilaurylsulfate. Among them, protamine; lysozyme; glycine; ethanol; sodium thiamine dilaurylsulfate; a mixture of protamine and lysozyme; a mixture of lysozyme and glycine; a mixture of protamine, lysozyme and glycine; a mixture of protamine, lysozyme and glycine; a mixture of protamine, lysozyme and ethanol is preferably added in combination with serine. Where protamine, lysozyme, glycine, ε-polylysine, ethanol, sodium acetate and/or sodium thiamine dilaurylsulfate is used in combination with serine, it is not necessarily required to subject protamine, lysozyme, glycine, ε-polylysine, ethanol, sodium acetate and/or sodium thiamine dilaurylsulfate to a low temperature heat treatment. These compounds combined with serine can effectively express bacteriostasis in food even if they are not heat-treated. However, it is preferred to perform the low temperature heat treatment to these compounds before or after they are added to the food. A use amount of the compounds to serine may suitably be selected depending on various factors such as kind and number of compounds to be used, a degree of bacteria contamination in the food, kind or quantity of ingredients of the food, how the food has been processed and addition amount of serine to be combined. For example, the compounds may be about 0.001 to 10 parts by weight, preferably about 0.005 to 5 parts by weight with respect to 1 part of serine.

The food preservative according to the present invention is comprised of serine. Serine decomposes at 228° C. and its chemical structure does not change through the low temperature heat treatment at less than 100° C. However, according to experiments performed by the inventors of the present invention, serine heated at low temperature showed more effective bacteriostasis to some kinds of bacteria than serine which is not heated at low temperature. In the present invention, accordingly, it is preferable to use serine heated at low temperature as a food preservative. The low temperature heat treatment can be carried out as mentioned above.

Serine subjected/not subjected to the low temperature heat treatment may be combined with protamine, lysozyme, glycine, ε-polylysine, ethanol, sodium acetate and/or sodium thiamine dilaurylsulfate. They may be subjected to the low temperature heat treatment together with or separately from serine, or they may not. Ratio between serine and protamine, lysozyme, glycine, ε-polylysine, ethanol, sodium acetate and/or sodium thiamine dilaurylsulfate may suitably be adjusted within the above-mentioned range.

Hereinafter, experimental examples of the process of preserving food and the food preservative according to the present invention are described.

Experimental Examples

1. Reagent

All reagents used herein were commercially available guaranteed ones.

2. Microorganism

Bacillus subtilis MF920 isolated from the surface of soy beans and Bacillus subtilis IF03134 were used as Gram-positive bacilli and Escherichia coli IFO13168 and Salmonella typhimurium IFO13245 were used as Gram-negative bacilli. Saccharomyces cerevisiae IFO1234 was used as eucaryote.

3. Culture Medium

A partially modified minimal medium of Davis & Mingiolli (DM) was used for bacteria cultivation to draw a growth curve. The composition thereof includes 14 g of $K_2HPO_4$, 6 g of $KH_2PO_4$, 0.2 g of $MgSO_4 \cdot 7H_2O$, 2 g of $(NH_4)_2SO_4$, 1.0 g of trisodium citrate dihydrate and 5 g of glucose. Water was added up to 1000 ml.

For cultivation of S. typhimurium, a partially modified medium of Olson & Johnson (OJ) was used. The composition thereof includes 6 g of $(NH_4)_2HPO_4$, 1 g of $KH_2PO_4$, 0.25 g of $MgSO_4 \cdot 7H_2O$, 1 g of trisodium citrate dihydrate, 20 μg of biotin, 10 mg of inositol, 0.5 mg of calcium pantothenate, 1 mg of pyridoxine, 0.4 mg of $ZnSO_4$, 0.15 mg of $FeSO_4(NH_4)_2SO_4 \cdot 6H_2O$, 25 μg of $CuSO_4$ and 9 g of glucose. Water was added up to 1000 ml and then NaOH or $H_3PO_4$ was used to set pH 7.0.

For cultivation of S. cerevisiae, a partially modified OJ medium was used after setting pH to 5.0 by using $H_3PO_4$.

For bacteria cultivation to measure viable cell count, a desoxycholate agar medium (manufactured by Nissui Pharmaceutical Ltd., Japan), a 802 growth medium (natural medium) or a DM medium was used. In 45 g of desoxycholate agar medium contained were 1.0 g of sodium deoxycholate, 10.0 g of peptone, 2.0 g of ferric ammonium citrate, 5.0 g of sodium chloride, 2.0 g of potassium hydrogen phosphate, 10.0 g of lactose, 0.033 g of neutral red and 15.0 g of agar. Water was added to 1 liter.

A standard agar medium (manufactured by Nissui Pharmaceutical Ltd.) and a potato dextrose agar medium (manufactured by Nissui Pharmaceutical Ltd.) were used to determine the viable cell count of general bacteria and that of fungi/yeasts, respectively, after the addition of serine to food.

4. Preparation of Bacteria Solution

Bacteria stored in slant media were inoculated on new DM slant media, respectively, to incubate Gram-positive bacillus and Gram-negative bacillus such as E. coli, B. subtilis and the like overnight at 37° C. S. cerevisiae was incubated at 30° C. on an OJ slant medium instead of the DM slant medium.

A loopful of each bacterium thus incubated on the slant medium was inoculated on a liquid medium prepared in an L-shaped tube containing a medium of the same composition, which was subjected to overnight shake culture to prepare solutions of each bacterium.

5. Test Methods and Results (1) Change in Viable Cell Count Through the Addition of Amino acid without a heat sterilization (i) Glycine, L-alanine, L-serine, L-lysine monohydrochloride, L threonine or L-arginine monohydrochloride was put in test tubes as an additive, respectively, and dissolved in sterilized purified water to prepare amino acid solutions of 10% (w/v). To 1 ml of each of the amino acid solutions 9 ml of the bacteria solution was added so that the concentration of each amino acid would be 1% (w/v).

The bacteria solution used herein contained B. subtilis MF920.

The test tubes containing these amino acids and the bacteria solution were allowed to stand at room temperature for 10 minutes and $10^4$ fold dilutions were obtained from the resulting solutions.

0.1 ml of each dilution was inoculated on three dishes and incubated for 2 days to count the number of expressed colonies as the viable cell count.

In the same manner as described above, a $10^4$ fold dilution prepared without adding amino acid was used as a blank and incubated to count expressed colonies as the viable cell count.

As a survival rate, the viable cell count of bacteria added with amino acid with respect to the viable cell count measured in the blank was measured. FIG. 1 shows the results.

FIG. 1 shows that the viable cell count of B. subtilis MF920 was hardly changed by merely adding amino acids without performing a heat treatment, as compared with the case where sterilized purified water was solely added without the addition of amino acids.

Figure 2:
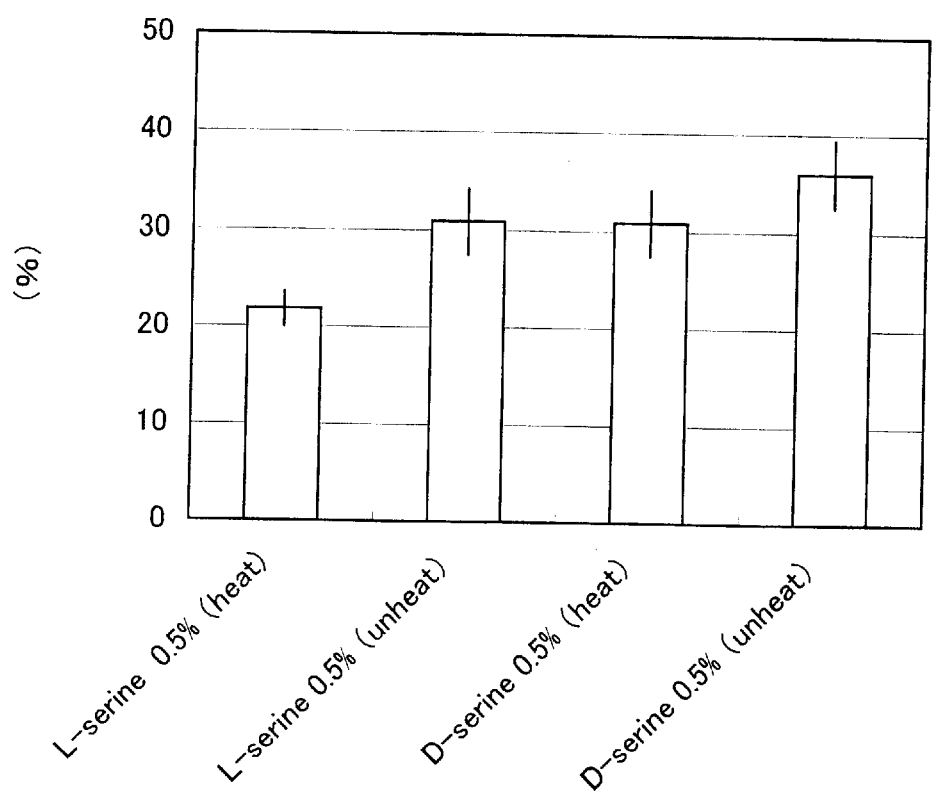
FIG. 2 is a graph illustrating the survival rates of *E. coli* where the heat sterilization was performed/not performed after addition of L- or D-serine in Example of the present invention.

(ii) The survival rate of E. coli was measured in the same manner as described above except that L-serine and D-serine of 0.5% (w/v) as the amino acids and an E. coli solution as the bacteria solution were used. As shown in FIG. 2, bacteria proliferation was inhibited to about 30% of the blank by the addition of L-serine, even though a heat treatment was not carried out. FIG. 2 also shows the results of a heat treatment at 80° C. for 10 minutes. The proliferation was further inhibited by the heat treatment.

(iii) L-serine or D-serine as the amino acid was dissolved in sterilized purified water and added with bacteria solutions (B. subtilis and S. typhimurium) of the same amount and then introduced in test tubes. 1 ml of each solution was inoculated on a 9 ml DM medium (partially modified) so that final serine concentration would be 0.5% (w/v). Turbidity of the medium added with the bacteria solution and serine was measured on 660 nm at 37° C. for 10 hours immediately after the inoculation and then growth curves of B. subtilis and S. typhimurium were formed. The results are shown in FIGS. 3 and 4, respectively.

As a control, turbidity was measured on a medium merely added with sterilized purified water instead of serine.

Figure 3:
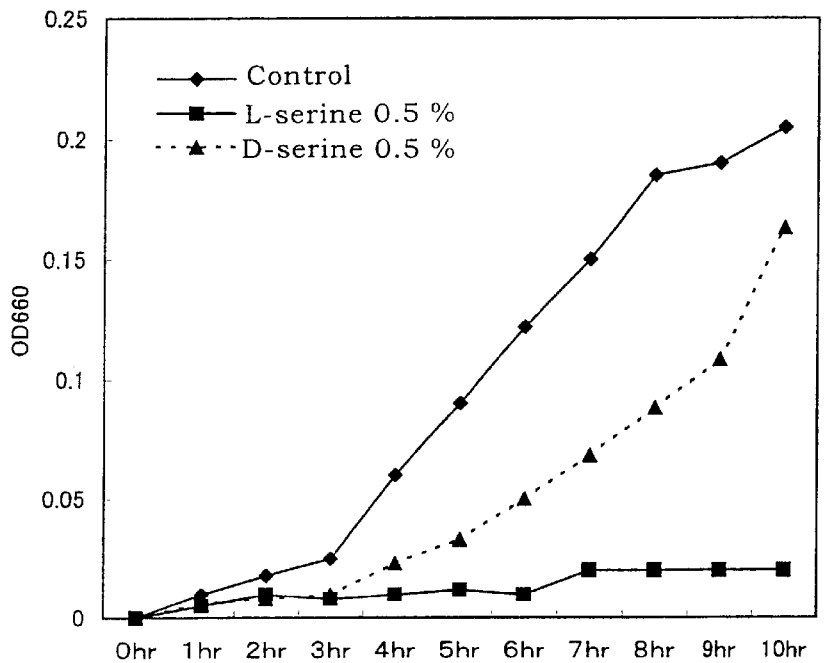
FIG. 3 is a growth curve of *B. subtilis* in the case where L- or D-serine was added in Example of the present invention.

FIG. 3 shows that proliferation of B. subtilis was strongly inhibited to about 10% by the addition of L-serine and to 80% by the addition of D-serine, as compared with the control.

Figure 4:
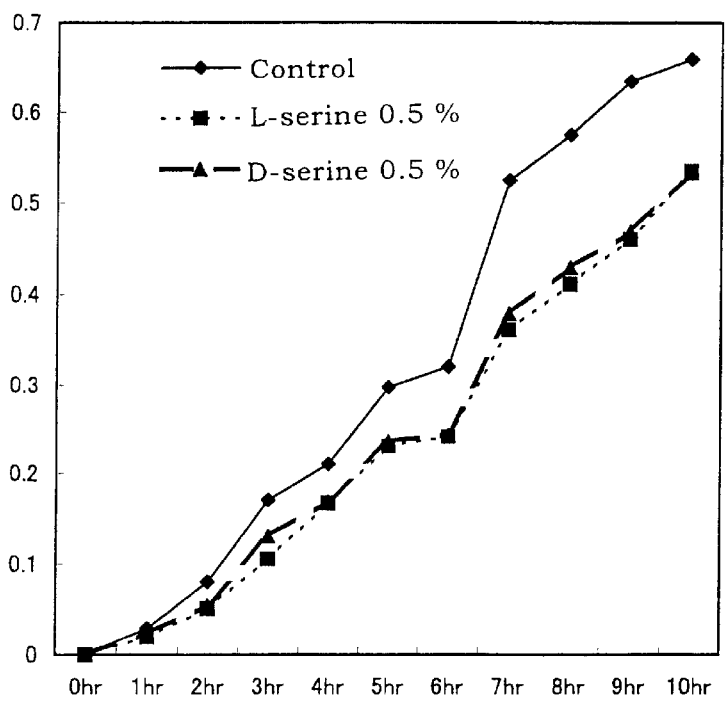
FIG. 4 is a growth curve of *Salmonella typhimurium* in the case where L- or D-serine was added in Example of the present invention.

Further, FIG. 4 shows that proliferation of S. typhimurium was inhibited to about 80% of the control in both media each added with L-serine and D-serine.

(2) Change in Viable Cell Count Through a Heat Treatment After the Addition of Amino Acids In the same manner as the above-mentioned (1)-(i), additives of glycine, L-alanine, L-serine, L-lysine monohydrochloride, L-threonine and L-arginine monohydrochloride were dissolved in sterilized purified water, respectively to prepare amino acid solutions of 10% (w/v). Then a bacteria solution (B. subtilis MF920) was added to 1 ml of each of the amino acid solutions so that amino acid concentration in each tube would be 1% (w/v).

The test tubes were heated at 80° C. for 10 minutes and then quenched. Then, 10 fold dilutions of the obtained bacteria solutions were prepared.

Figure 5:
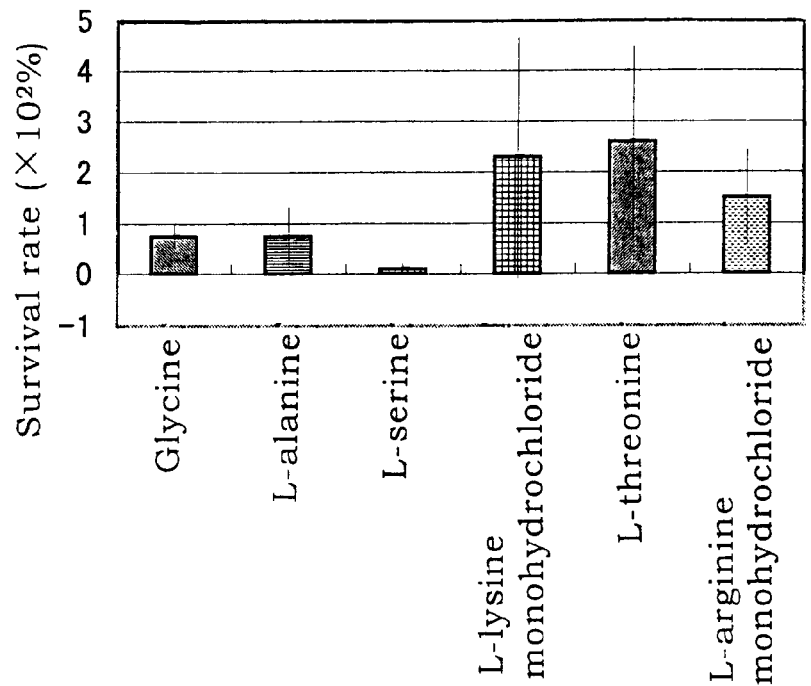
FIG. 5 is a graph illustrating the survival rate of *B. subtilis* in the case where the heat sterilization was performed after addition of amino acids.

0.1 ml of each dilution was inoculated on three dishes and incubated 2 days to count expressed colonies. The survival rate was measured in the same manner as described above. FIG. 5 shows the results.

From FIG. 5, it is observed that the viable cell count was slightly reduced in the cases where glycine and L-alanine were added, as compared with the case where sterilized purified water was added solely. Further, the addition of L-serine remarkably reduced the viable cell count, as compared with the case where purified water was added solely.

In contrast, increase in the viable cell count was observed in the cases where L-lysine, L-threonine and L-arginine were added.

(3) Change in Viable Cell Count Through a Heat Treatment Performed After the Addition of L-serine at Various Concentrations L-serine, which showed the greatest reduction of the viable cell count in the above-mentioned (2), was added at various concentrations and a heat treatment was performed to examine change in the viable cell count.

Figure 6:
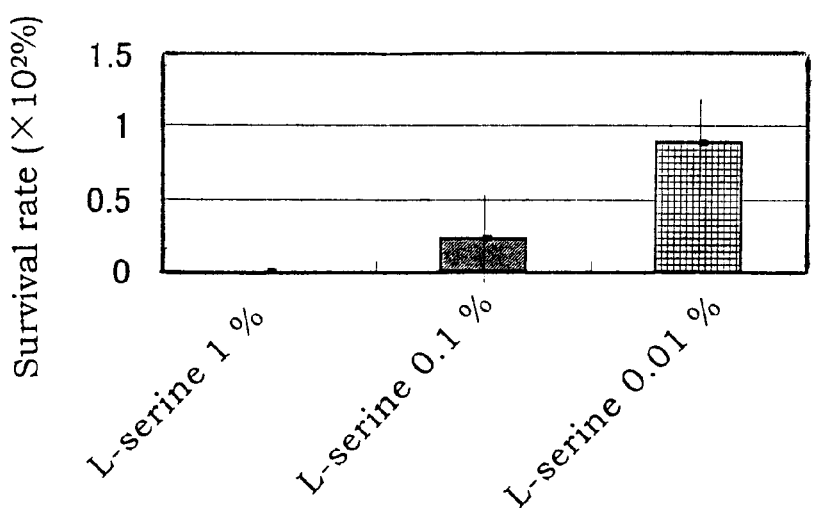
FIG. 6 is a graph illustrating the survival rate of *B. subtilis* in the case where L-serine was added in various concentrations and then the heat sterilization was performed in Example of the present invention.

Change in the bacteria survival rate was examined in the same manner as the above-mentioned (2) except that the concentration of L-serine was varied within 0.01 to 1% (w/v). FIG. 6 shows the results.

FIG. 6 shows that the higher the L-serine concentration was, the more the survival rate decreased.

(4) Change in Viable Cell Count through the Addition of D-serine or L-serine in Combination with Protamine (i) Turbidity of the medium was measured on 660 nm for 8 hours immediately after the inoculation and the growth curve of *E. coli* was formed in the same manner as the above-described (1)-(iii) except that L-serine of 1.5% (w/v), or L-serine or D-serine of 1.5% (w/v) and protamine of 0.1% (w/v), each at the final concentration, were added and an *E. coli* solution was used. The results are shown in FIG. 7.

Figure 7:
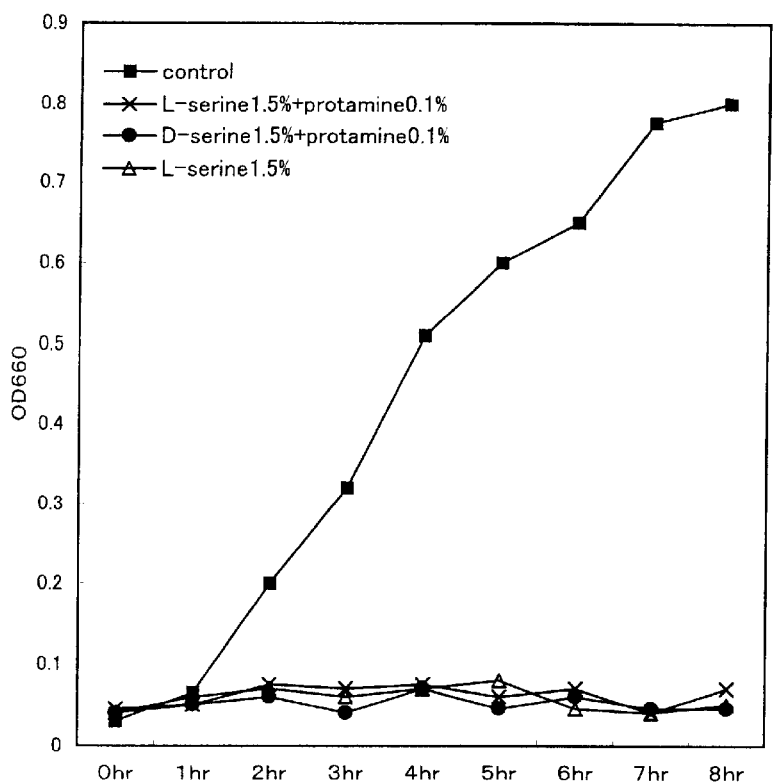
FIG. 7 is a growth curve of *E. coli* in the case where L- or D-serine and protamine were used in combination in Example of the present invention.

FIG. 7 shows that proliferation of *E. coli* was inhibited to about 40% of the control where L-serine was solely inhibited. The addition of L-serine or D-serine in combination with protamine showed extremely strong inhibition of *E. coli* proliferation to about 25% or about 15% of the control.

(ii) Turbidity was measured on 660 nm for 8 hours immediately after the inoculation and growth curves of *S. typhimurium* and *B. subtilis* were formed in substantially the same manner as the above-described (1)-(iii), except that only L-serine or D-serine of 0.5% (w/v), or L-serine or D serine of 0.5% (w/v) in combination with protamine of 0.03% (w/v), each at the final concentration, were added and solutions of *S. typhimurium* and *B. subtilis* were used. The results are shown in FIGS. 8 and 9.

Figure 8:
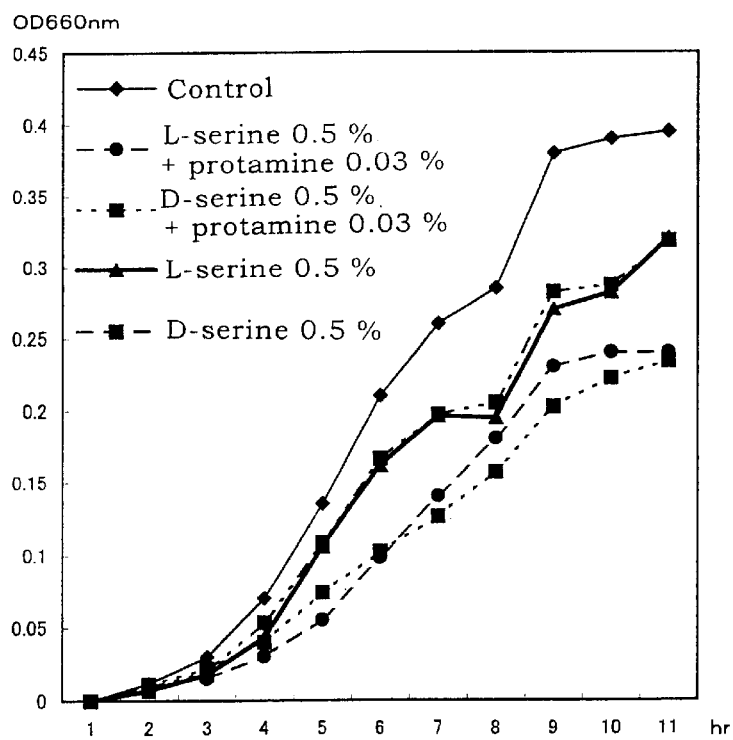
FIG. 8 is a growth curve of *S. typhimurium* in the case where L- or D-serine and protamine were used in combination in Example of the present invention.

FIG. 8 shows that the addition of L-serine or D-serine inhibited proliferation of *S. typhimurium* to about 80% of the control. In contrast, the addition of L-serine or D-serine in combination with protamine showed extremely strong proliferation of *S. typhimurium* to about 60% of the control.

Figure 9:
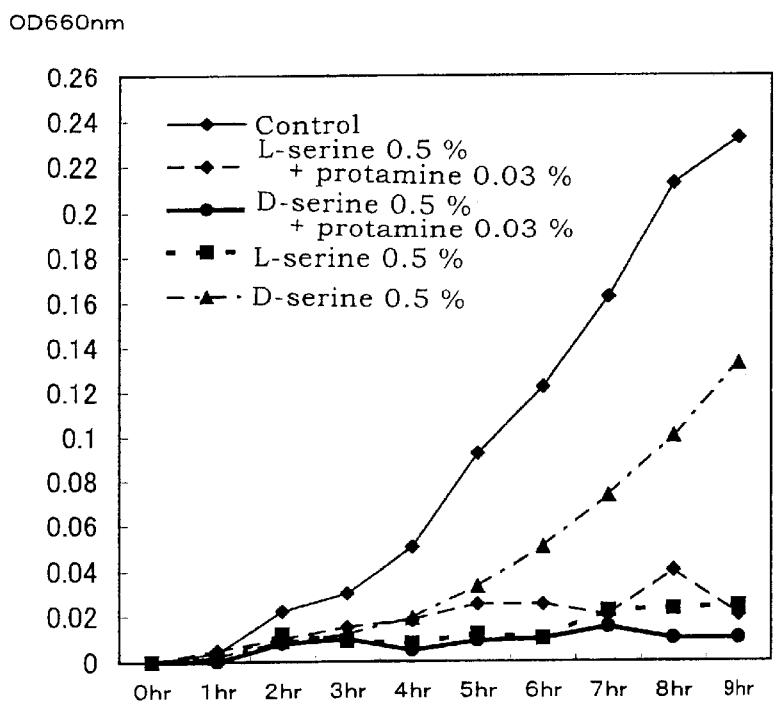
FIG. 9 is a growth curve of *B. subtilis* in the case where L- or D-serine and protamine were used in combination in Example of the present invention.

Further, FIG. 9 shows that the addition of D-serine only inhibited proliferation of *B. subtilis* to about 50% of the control. In contrast, the addition of L-serine or D-serine in combination with protamine showed extremely strong inhibition of *B. subtilis* proliferation to about 10% of the control.

Figure 10:
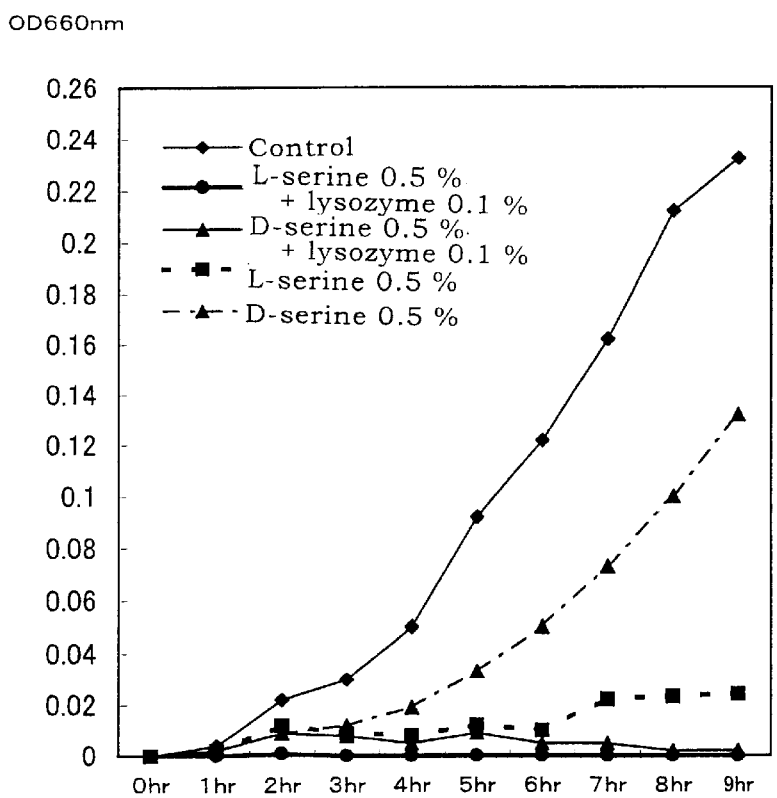
FIG. 10 is a growth curve of *B. subtilis* in the case where L- or D-serine and lysozyme were used in combination in Example of the present invention.

(5) Change in Viable Cell Count Through the Addition of D-serine or L-serine in Combination with Lysozyme Growth curves of *B. subtilis* were formed in the same manner as the above-described (4) except that protamine of 0.03% (w/v) was replaced with lysozyme of 0.1% (w/v). FIG. 10 shows the result.

FIG. 10 shows that in particular when D-serine was solely added, *B. subtilis* proliferation was merely inhibited to about 50% of the control. In contrast, the addition of L-serine or D-serine in combination with lysozyme showed extremely strong inhibition of *B. subtilis* proliferation to about 10% of the control.

(6) Change in Viable Cell Count Through a Heat Treatment Performed Immediately After the Addition of L-serine in the Presence of Casein L-serine of 0% or 1% (w/v), casein of 1 to 4% (w/v) and a 802 growth medium were added in test tubes. The test tubes were heated at 40° C. for 10 minutes and quenched. 10-fold dilutions of the resulting solutions were prepared. 0.1 ml of each of the dilutions was inoculated on three dishes, incubated for one day and expressed colonies were counted to examine change in the *E. coli* survival rate. The results are shown in FIG. 11.

Figure 11:
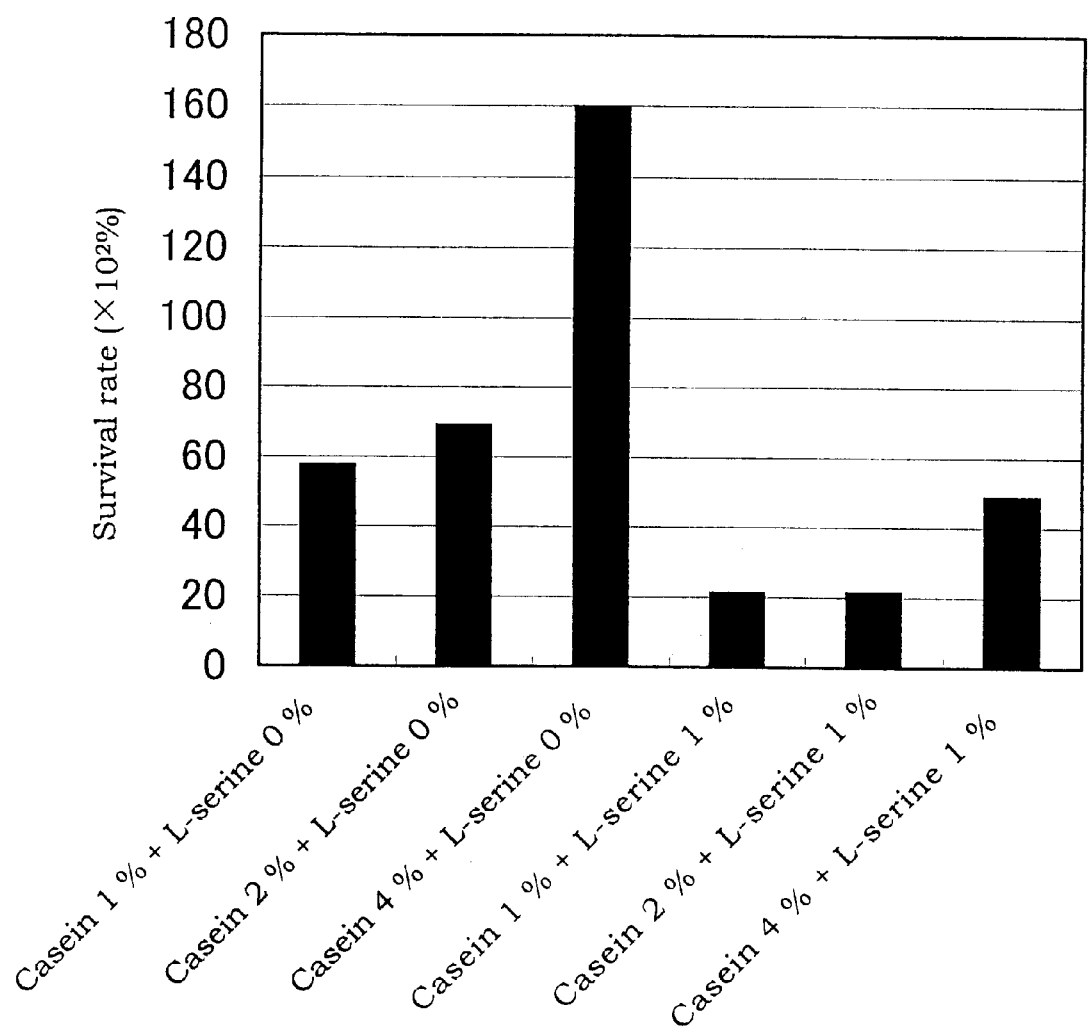
FIG. 11 is a graph illustrating the survival rate of *E. coli* in the case where L-serine was added in the presence of casein and the heat sterilization was performed in Example of the present invention.

FIG. 11 shows that where casein was solely added, inhibition/proliferation of about 60 to 160% as compared with the control was observed in proportion to the casein concentration. In contrast, the addition of L-serine in the presence of casein showed effective inhibition of *E. coli* proliferation.

(7) Change in Viable Cell Count in Food Added with L-serine and Protamine and/or Lysozyme (i) As a preservative of the present invention, a preservative A (L-serine 98.0% (w/w) and protamine 2.0% (w/w)) was added to custard cream and stored at 30° C. for one day. This was inoculated on three dishes, incubated for 2 days and expressed colonies were counted to measure change in the viable cell count. Custard cream with nothing added as a control and that added with a commercially available preservative ① (protamine 2.0% (w/w) and glycine 98.0% (w/w)) were prepared to measure change in the viable cell count.

The addition of the preservative A or the preservative ① to the custard cream was carried out by mixing the preservative A or the preservative ① with yolk in an amount of 1% (w/w) of the total weight of materials used, respectively. The results are shown in FIG. 12.

Figure 12:
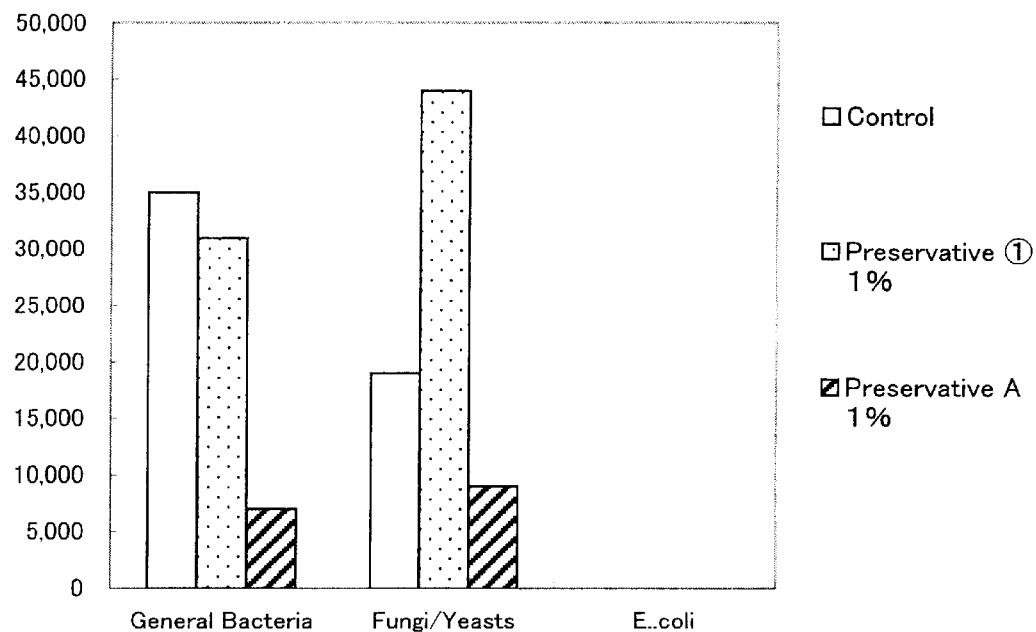
FIG. 12 is a graph illustrating the viable cell count of bacteria in food added with L-serine and protamine and lysozyme in Example of the present invention.

FIG. 12 shows that the addition of the preservative A exhibited remarkable bacteriostasis as compared with the control and the preservative ①.

(ii) As a preservative of the present invention, a preservative B (lysozyme 1.0% (w/w), protamine 4.0% (w/w) and L-serine 95.0% (w/w)) was added to tuna mayonnaise, which was stored at 30° C. for 5 days. This was inoculated on three dishes, incubated for two days and expressed colonies were counted to measure change in the viable cell count. Tuna mayonnaise with nothing added as a control and that added with a commercially available preservative ② (lysozyme 1.0% (w/w), protamine 2.0% (w/w), glycine 30.0% (w/w), sodium acetate 20.0% (w/w), citric acid 5.0% (w/w) and glycerine fatty acid ester 1.5% (w/w)) were prepared to measure change in the viable cell count.

Figure 13:
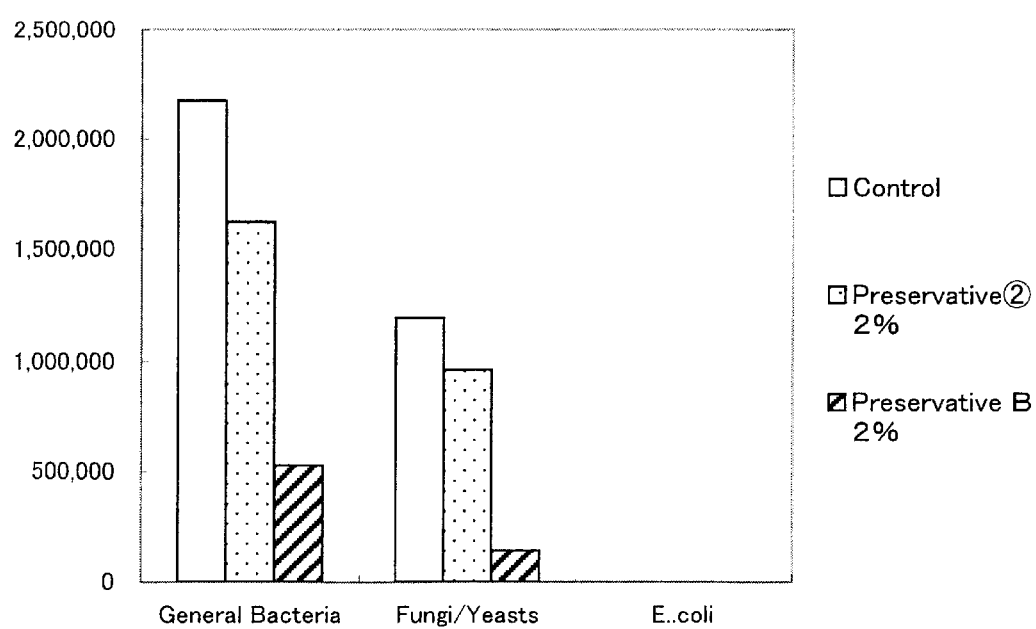
FIG. 13 is a graph illustrating the viable cell count of bacteria in food added with L-serine, protamine and lysozyme in Example of the present invention.

The addition of the preservative B or the preservative ② to the tuna mayonnaise was carried out by mixing the preservative B or the preservative ② with tuna mayonnaise in an amount of 2% (w/w) of the total weight of tuna mayonnaise. FIG. 13 shows the results.

FIG. 13 shows that the addition of the preservative B exhibited remarkable bacteriostasis as compared with the control and the preservative ②.

Figure 14:
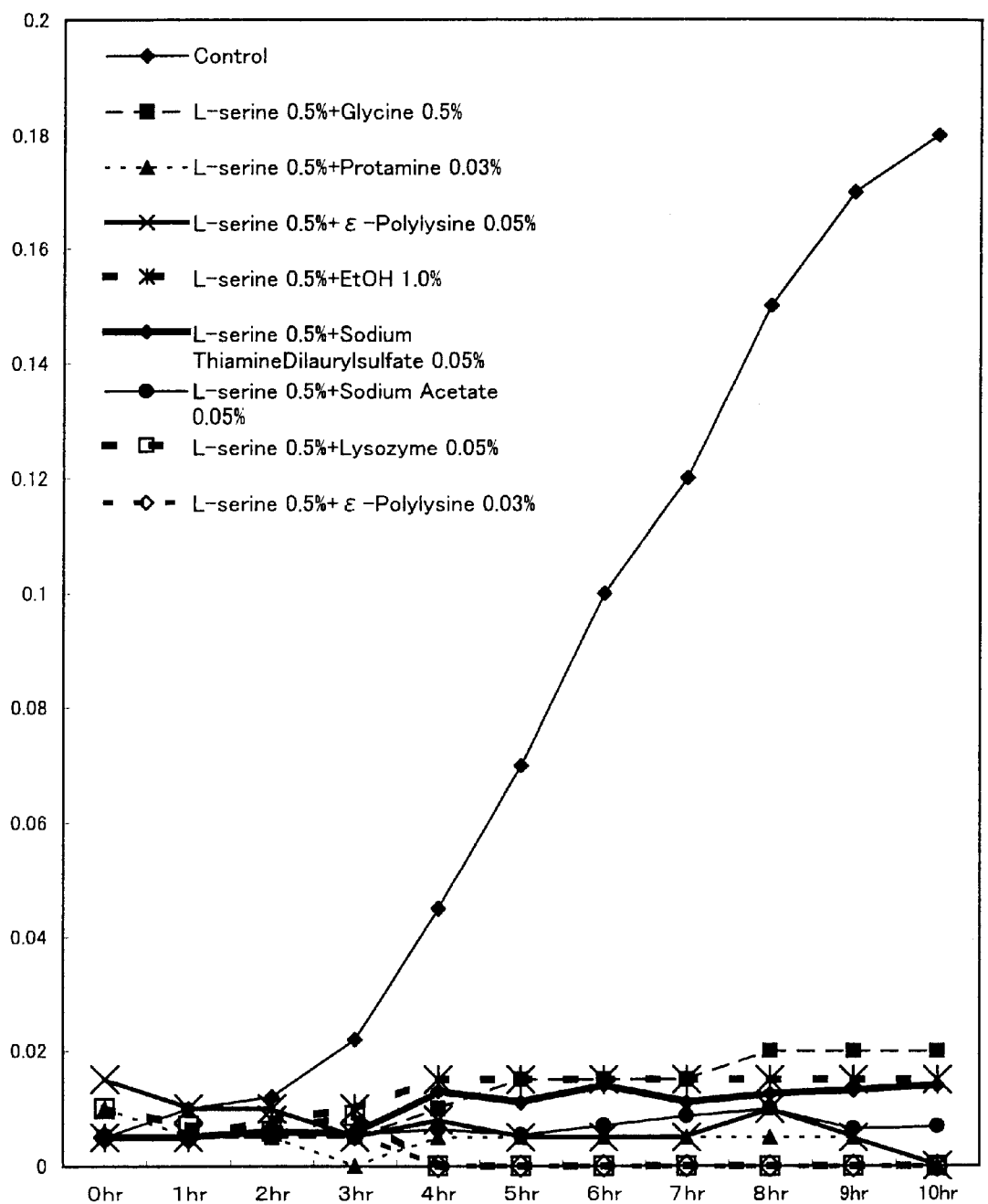
FIG. 14 is a growth curve of *S. typhimurium* where L-serine, protamine and the like were added in Example of the present invention.
Figure 15:
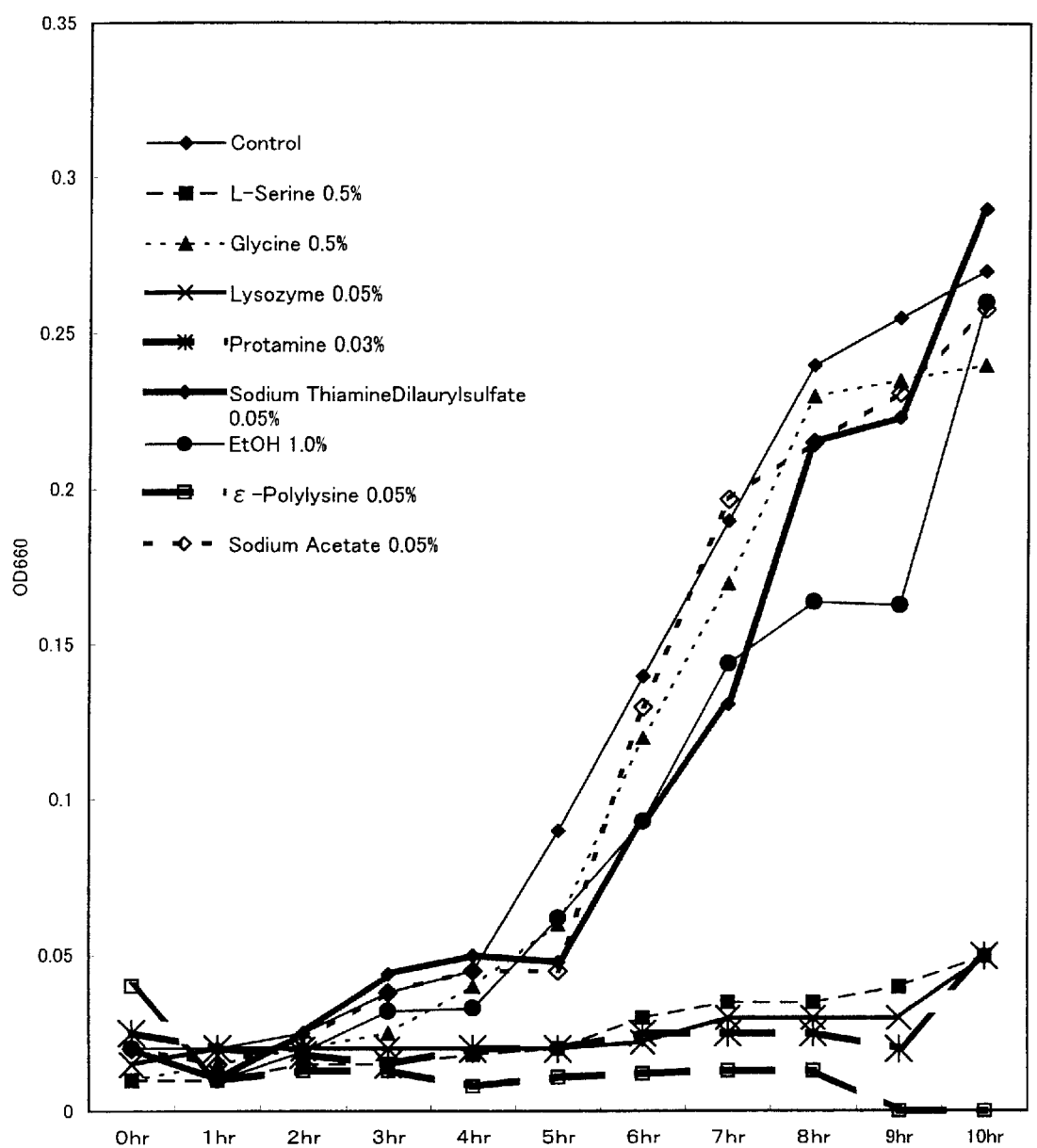
FIG. 15 is a growth curve of *S. typhimurium* where L-serine was solely added in Example of the present invention.
Figure 16:
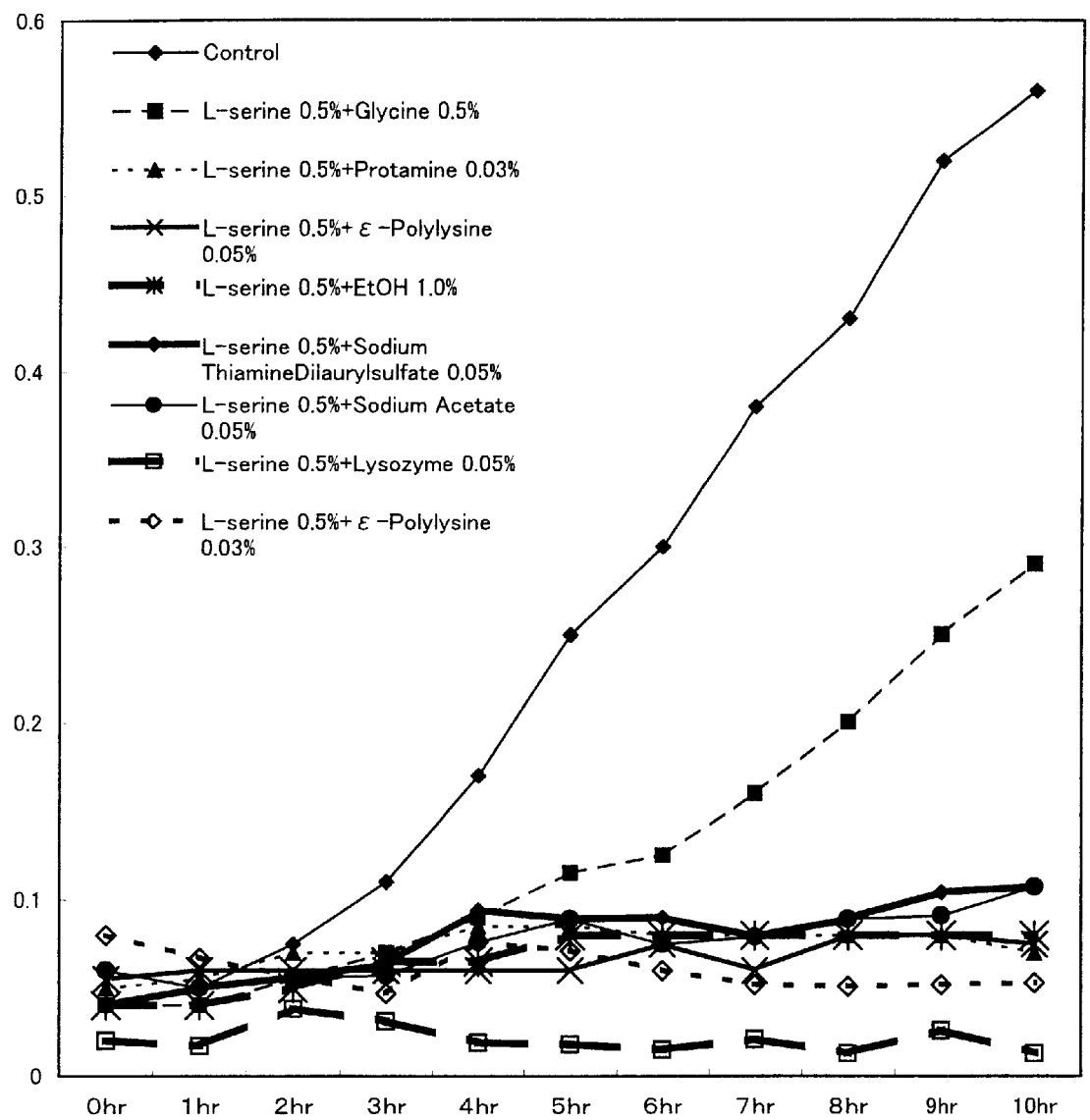
FIG. 16 is a growth curve of *B. subtilis* where L-serine, protamine and the like were added in Example of the present invention.
Figure 17:
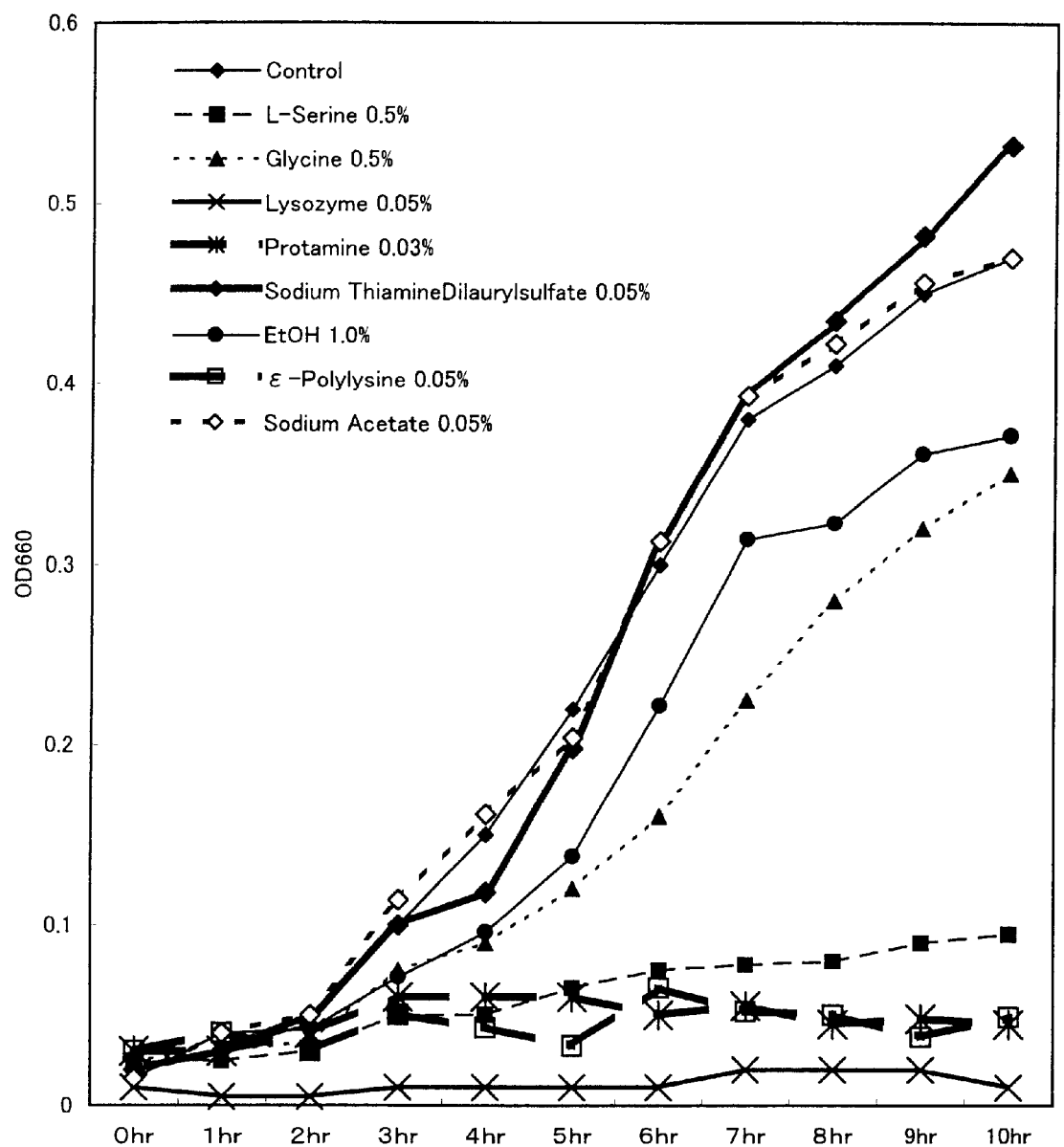
FIG. 17 is a growth curve of *B. subtilis* where L-serine was solely added in Example of the present invention.
Figure 18:
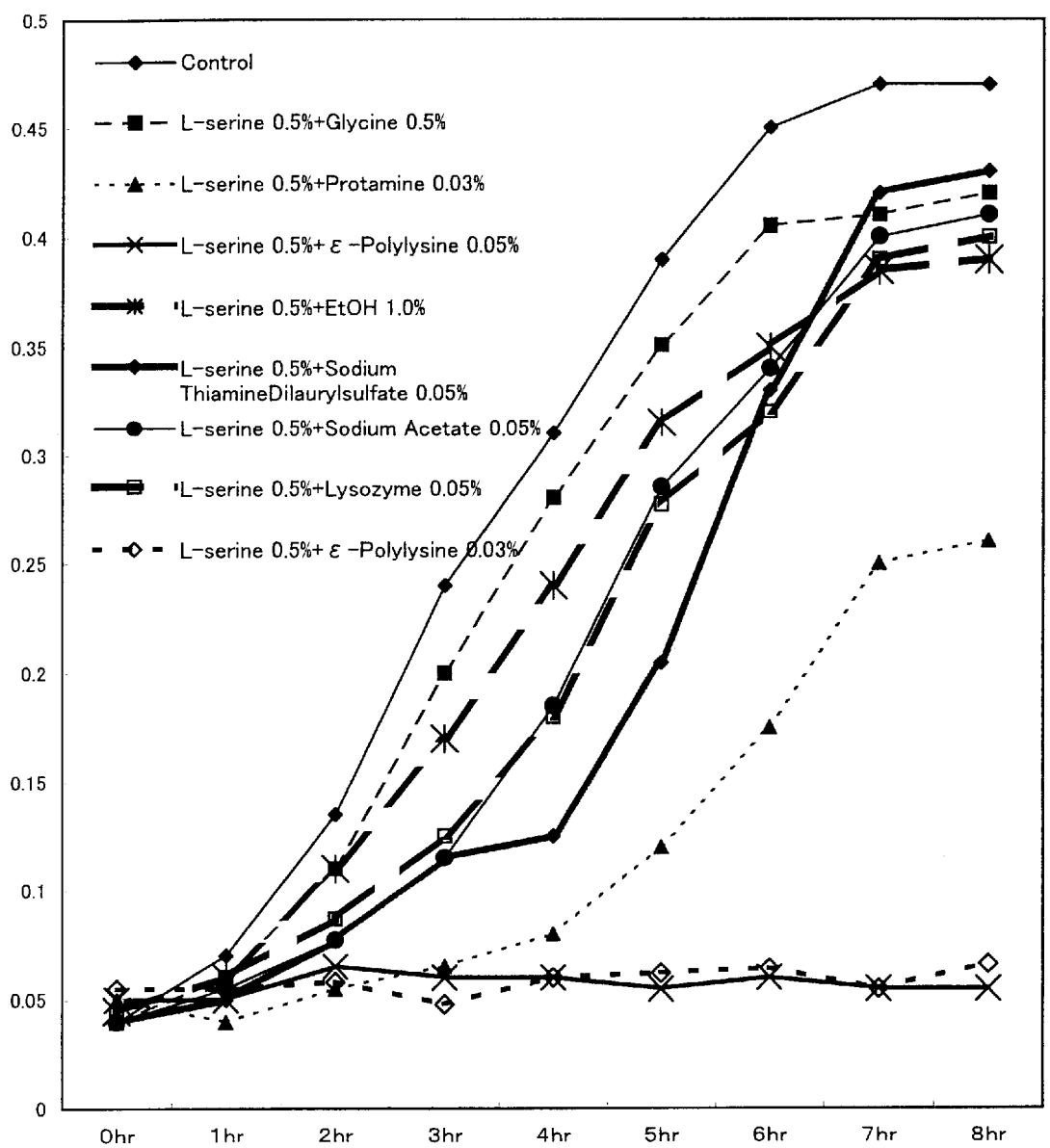
FIG. 18 is a growth curve of *E. coli* where L-serine, protamine and the like were added in Example of the present invention.
Figure 19:
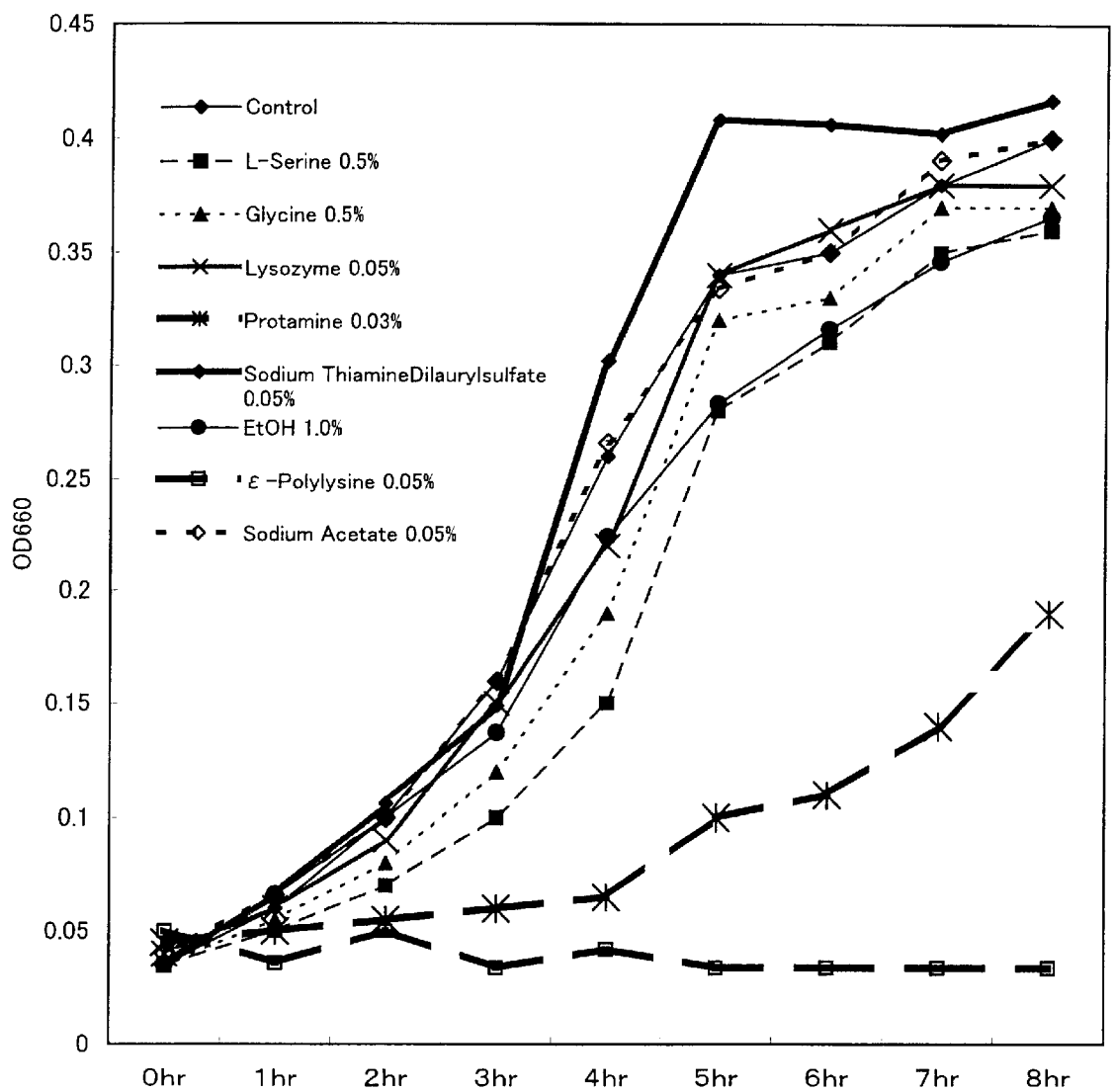
FIG. 19 is a growth curve of *E. coli* where L-serine was solely added in Example of the present invention.

(8) Change in Viable Cell Count Through the Addition of L-serine in Combination with Protamine, Lysozyme, Glycine, ε-polylysine, Ethanol, Sodium Acetate and/or Sodium Thiamine Dilaurylsulfate Without a Heat Treatment With compounds shown in FIGS. 14, 16 and 18, growth curves of *S. typhimurium, B. subtilis* and *E. coli* were formed in substantially the same manner as the above-described (1)-(111), respectively. The results are shown in FIGS. 14, 16 and 18, respectively. For comparison, the compounds were solely used without L-serine and the growth curves of S. *typhimurium*, *B. subtilis* and *E. coli* were formed. The results are shown in FIGS. 15, 17 and 19, respectively.

From FIGS. 14, 16 and 18, it is observed that the use of serine in combination with other compounds showed synergism on bacteriostasis to every bacterium.

(9) Change in Viable Cell Count in Food Added with L-serine and the Like (i) As a preservative of the present invention, a preservative C (L-serine 99.0% (w/w) and lysozyme 1.0% (w/w)) or a preservative D (L-serine 49.5% (w/w), lysozyme 1.0% (w/w) and glycine 49.5% (w/w)) was added to fried chicken, which was stored at 30° C. for 6 days to measure the viable cell count. Fried chicken with nothing added as a control and that added with a commercially available preservative ③ (lysozyme 0.2% (w/w), adipic acid 13.0% (w/w), glycine 29.5% (w/w) and sodium acetate 57.5% (w/w)) were prepared to measure change in the viable cell count.

The preservative C or D and the preservative C were added to the fried chicken by mixing with potato starch used to make the fried chicken in an amount of 1.5% (w/w) and 5% (w/w) of the potato starch, respectively.

The fried chicken was prepared in the following manner. First, 180 g of chicken and 50 g of soy sauce were put in a plastic bag and kneaded for seasoning. The seasoned chicken was divided by 30 g. 5 g potato starch was added to the chicken. They were mixed well, kept for a while and deep-fried in oil. Pieces of chicken thus fried were aerated at room temperature for cooling and packed and stored in a plastic bag. Then, the viable cell count was measured. The results are shown in FIG. 20.

Figure 20:
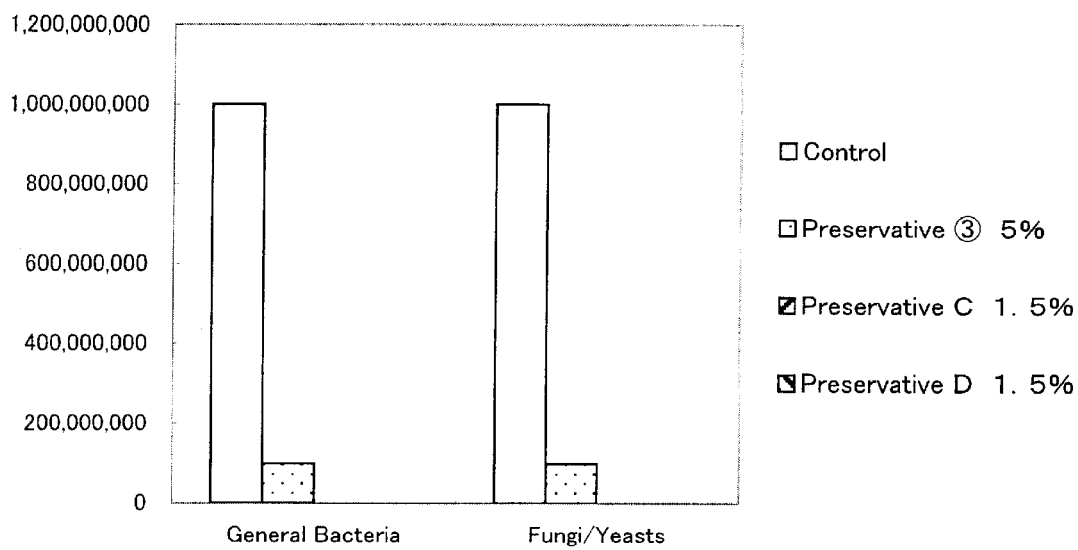
FIG. 20 is a graph illustrating the viable cell count of bacteria in food added with two or more kinds of compounds such as L-serine and the like in Example of the present invention.

FIG. 20 shows that the viable cell count was very small in the case where the preservative C or D was added. Fried chicken added with the preservative ③ also reduced the viable cell count but it tasted sour because acid was contained in the preservative ③.

(ii) As a preservative of the present invention, a preservative E (L-serine 59.5% (w/w), lysozyme 1.5% (w/w), protamine 3.0% (w/w) and glycine 38% (w/w)) was added to a soybean flour product and stored at 4° C. for 8 days to measure the viable cell count. A soybean flour product with nothing added as a control and that added with commercially available preservatives ③ and ④ (containing 16.4% decomposed milt) were prepared to measure the viable cell count.

To the soybean flour product, the preservative E was added in an amount of 0.5%, and the preservatives ③ and ④ were added in an amount of 3.75% and 0.1%, respectively, of the total weight of the soybean flour product.

The soybean flour product was prepared by stirring 200 g wheat flour, 50 g soybean flour and 20 g granulated sugar in a mortar, adding 35 g sterilized purified water portion wise and further mixing them. The obtained mixture was put in a plastic bag and incubated overnight at 30° C. The preservatives were individually added thereto, and sufficiently stirred to obtain uniform mixtures, which were packed and stored in plastic bags. Then the viable cell count was measured. The results are shown in FIG. 21.

Figure 21:
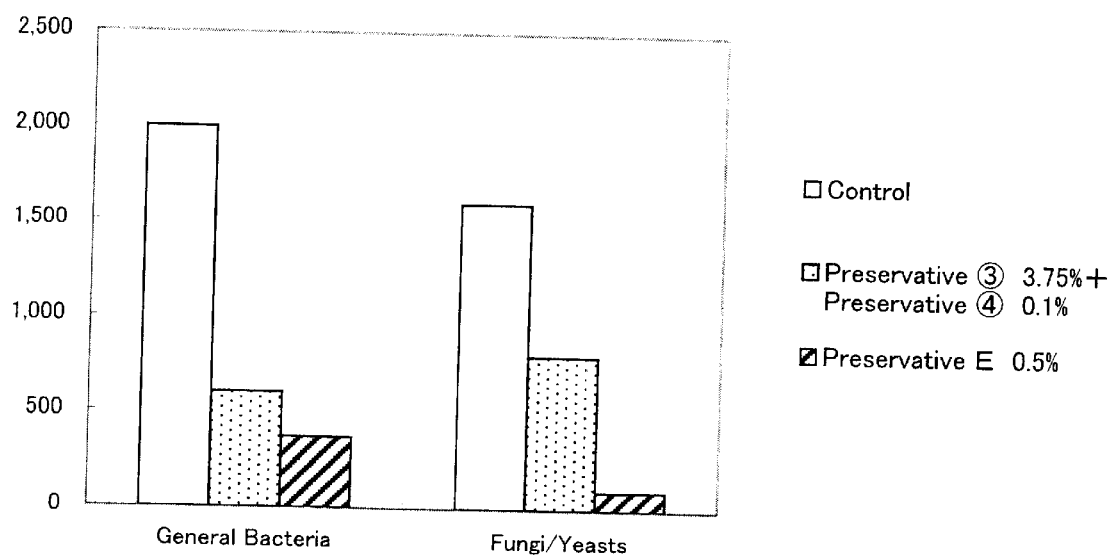
FIG. 21 is a graph illustrating the viable cell count of bacteria in food added with two or more kinds of compounds such as L-serine and the like in Example of the present invention.

FIG. 21 shows that the viable cell count was very small in case where the preservative E was added. The soybean flour product added with a combination of the preservatives ③ and ④ also reduced the viable cell count as compared with the control, but it tasted sour because acid was contained in the preservative ③.

(iii) As a preservative of the present invention, a preservative F (L-serine 28.0% (w/w), lysozyme 0.4% (w/w), protamine 1.0% (w/w) and ethanol 20% (w/w)) was added to cabbage and stored at 30° C. for 24 hours to measure the viable cell count. Cabbage with nothing added as a control and that added with a combination of commercially available preservatives ③ and ⑤ (decomposed milt 2.0% (w/w), sodium acetate 2.4% (w/w), ethanol 4.0% (w/w), glycine 9.5% (w/w) and citric acid 0.9% (w/w)) were prepared to measure the viable cell count.

The addition of the preservative F or the combination of the preservatives ③ and ⑤ was carried out by mixing an aqueous solution containing 5% of the preservative F or an aqueous solution containing 5% of the preservative ③ and 2.5% of the preservative ⑤.

Stripped cabbage was washed with water, strained and shredded. The thus shredded cabbage of 40 g was soaked in 400 g of each aqueous solution of the preservative at the above-described concentration for 5 minutes while lightly stirring every one minute without bubbling. The cabbage was sufficiently strained and then packed and stored in a plastic bag. Then the viable cell count was measured. The results are shown in FIG. 22.

Figure 22:
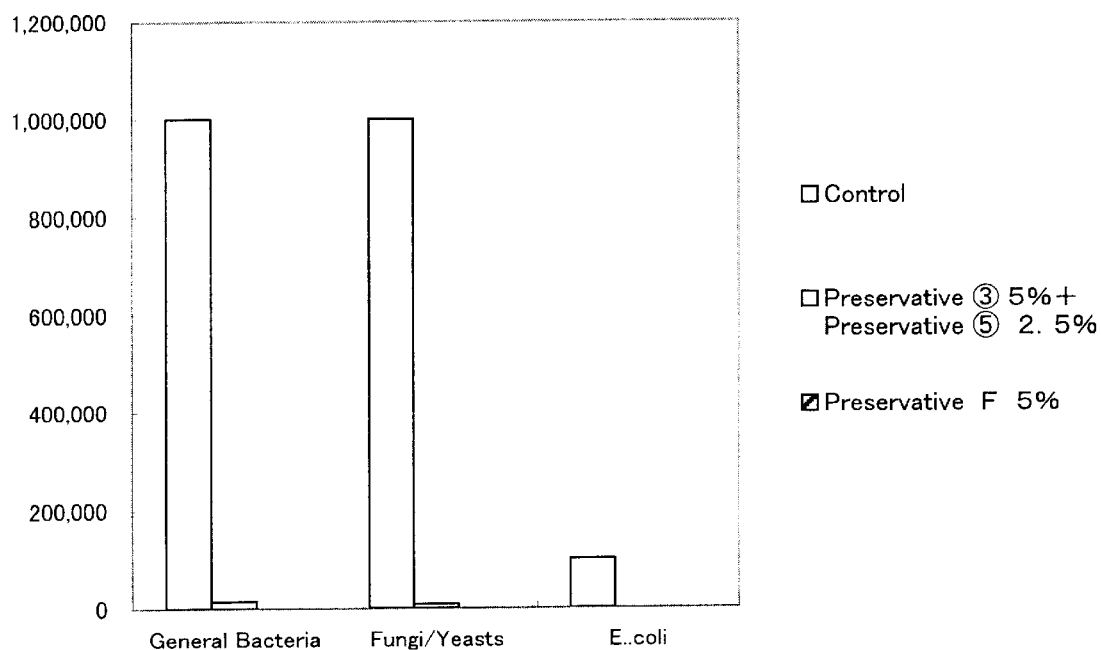
FIG. 22 is a graph illustrating the viable cell count of bacteria in food added with two or more kinds of compounds such as L-serine and the like in Example of the present invention.

FIG. 22 shows that the viable cell count was very small in the case where the preservative F was added. Cabbage added with the preservatives ③ and ⑤ also reduced the viable cell count as compared with the control, but it tasted sour because acid was contained in the preservative ③.

(iv) As a preservative of the present invention, a preservative G (L-serine 98.5% (w/w) and lysozyme 1.5% (w/w)) was added to bean paste and stored at 37° C. for 3 days to measure the viable cell count. Bean paste with nothing added as a control and that added with the commercially available preservative ③ was prepared to measure the viable cell count.

The preservative G and ③ were added to the bean paste in an amount of 2% and 3%, respectively, of the total weight of the bean paste.

The bean paste used was a bean paste kneaded with sugar. The preservative was added to the bean paste and kneaded well so that the preservative was uniformly dispersed. This was aerated for about 30 minutes and packed in a plastic bag and then the viable cell count was measured. The results are shown in FIG. 23.

Figure 23:
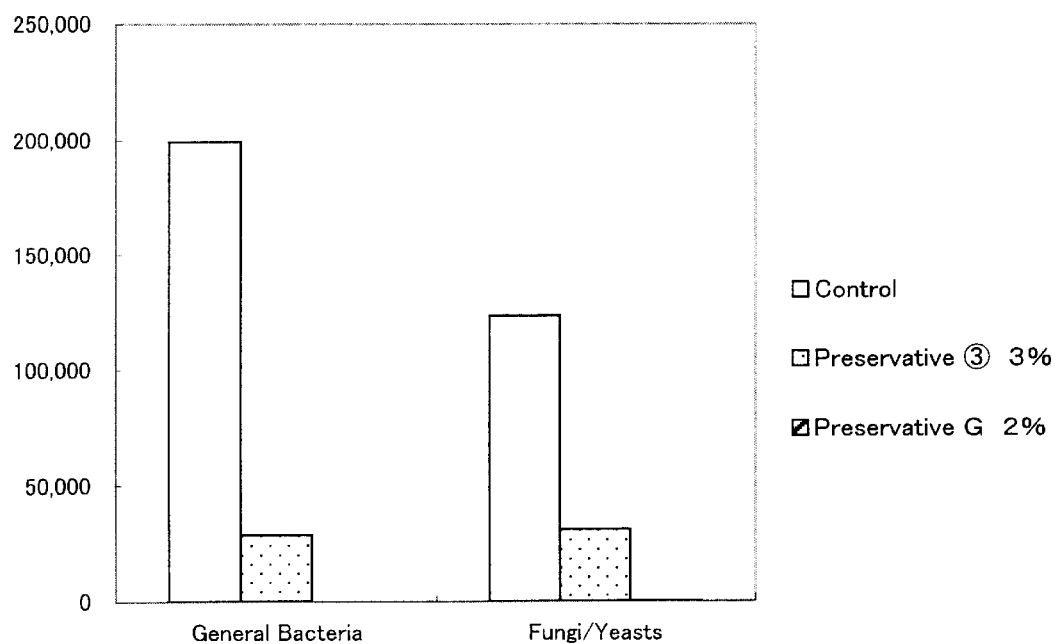
FIG. 23 is a graph illustrating the viable cell count of bacteria in food added with two or more kinds of compounds such as L-serine and the like in Example of the present invention.

FIG. 23 shows that the viable cell count was very small in the case where the preservative G was added. Bean paste added with the preservative ③ also reduced the viable cell count as compared with the control, but it tasted sour because acid was contained in the preservative ③.

(10) Analysis of L-serine After a Heat Treatment

L-serine was added in 1% (w/v) to the bacteria solution and to the medium used in the above. The obtained bacteria culture solution and medium were divided in two test tubes, respectively. One of them was allowed to stand at room temperature for 10 minutes and the other was heated at 80° C. for 10 minutes. Both were quenched and diluted so that the L-serine concentration would be 2 nmol/10 μl and amino acid analysis was carried out with an amino acid automatic analyzer. The results are shown in Table 1.

TABLE 1

|  | Bacteria solution heated | Bacteria solution unheated | Medium heated | Medium unheated |
|---|---|---|---|---|
| L-serine concentration (nmol/10 μl) | 2.3 | 2.3 | 2.3 | 2.2 |

Table 1 shows that L-serine would not be decomposed by heating at 80° C. for 10 minutes regardless of the presence of bacteria.

According to the present invention, provided is a convenient process of preserving food for a long term by adding serine to food, in particular by performing a heat treatment after the addition of serine to food. Since serine is one kind of amino acids, it does not deteriorate quality of food itself and can preserve food safely.

In particular when serine is added in combination with compounds such as protamine and the like, bacteriostasis action is enhanced so that food is preserved more reliably.

Bacteria in food generally containing casein, e.g., dairy foods at neutral pH range, may sometimes be resistant to known preservatives. However, serine ensures effective preservation of food even in the presence of casein.

What is claimed is:

1. A process of preserving food comprising: adding to food a preservably effective amount of serine, and one compound selected from the group consisting of protamine, lysozyme, ε-polylysine, ethanol, and sodium thiamine dilaurylsulfate.

2. A process according to claim 1, wherein serine is L-serine.

3. A process according to claim 1, wherein serine is added to food in the range of 0.1 to 10 wt % with respect to the total weight of the food.

4. A process according to claim 1, wherein the serine is subjected to a heat treatment at low temperature before the addition of serine to food.

5. A process according to claim 4, wherein the heat treatment at low temperature is to maintain at a temperature of less than 100° C. for about several minutes to several tens of minutes under normal pressure.

6. A process according to claim 5, wherein the heat treatment at low temperature is carried out at 60 to 70° C. for 20 to 30 minutes or at 80° C. for 10 minutes under normal pressure.

7. A process according to claim 1, wherein a heat treatment at low temperature is carried out after the addition of serine to food.

8. A process according to claim 1, wherein protamine, lysozyme, glycine, ε-polylysine, ethanol, sodium acetate and/or sodium thiamine dilaurylsulfate is added to food in the range of 0.001 to 10 parts by weight with respect to 1 part of serine.

9. A process according to claim 1, wherein protamine; lysozyme; ethanol; sodium thiamine dilaurylsulfate; a mixture of protamine and lysozyme; a mixture of lysozyme and glycine; or a mixture of protamine, lysozyme and ethanol is added in combination with seine.

10. A process according to claim 1, wherein food contains casein.

11. A food preservative comprising serine as an active ingredient and at least one compound selected from the group consisting of protamine, lysozyme, ε-polylysine, ethanol, and sodium thiamine dilaurylsulfate.

12. A food preservative cording to claim 11, wherein protamine; lysozyme; ethanol; sodium thiamine dilaurylsulfate; a mixture of protamine and lysozyme; a mixture of lysozyme and glycine; a mixture of protamine, lysozyme and glycine; a mixture of protamine, lysozyme and glycine; or a mixture of protamine, lysozyme and ethanol is incorporated.

13. A food preservative a cording to claim 11, wherein the seine is subjected to a heat treatment at low temperature.

14. A food preservative according to claim 13, wherein the heat treatment at low temperature is to maintain at temperature of less than 100° C. for about several minutes to several tens of minutes under no al pressure.

15. A food preservative according to claim 14, wherein the heat treatment at low temperature is carried out at 60 to 70° C. for 20 to 30 minutes or at 80° C. for 10 minutes under normal pressure.

16. A food preservative according to claim 11, wherein protamine, lysozyme, ε-polylysine, ethanol, and sodium thiamine dilaurylsulfate subjected to a heat treatment at low temperature is used.

17. A food preservative according to claim 11, wherein protamine, lysozyme, ε-polylysine, ethanol, and/or sodium thiamine dilaurylsulfate is added in the range of 0.001 to 10 parts by weight with respect to 1 part of serine.

* * * * *